(12) United States Patent
Kitade et al.

(10) Patent No.: US 9,983,467 B2
(45) Date of Patent: May 29, 2018

(54) PHOSPHOR WHEEL AND PROJECTION-TYPE IMAGE DISPLAY DEVICE

(71) Applicant: PANASONIC INTELLECTUAL PROPERTY MANANGEMENT CO., LTD., Osaka (JP)

(72) Inventors: Naoya Kitade, Osaka (JP); Manabu Chikayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/597,990

(22) Filed: May 17, 2017

(65) Prior Publication Data

US 2017/0261844 A1    Sep. 14, 2017

Related U.S. Application Data

(63) Continuation of application No. PCT/JP2016/003847, filed on Aug. 24, 2016.

(30) Foreign Application Priority Data

Mar. 8, 2016   (JP) .................................. 2016-045034

(51) Int. Cl.
| | |
|---|---|
| G03B 21/20 | (2006.01) |
| G03B 21/16 | (2006.01) |
| G02B 26/00 | (2006.01) |
| G02B 7/00 | (2006.01) |
| H04N 9/31 | (2006.01) |

(52) U.S. Cl.
CPC ............. *G03B 21/16* (2013.01); *G02B 7/008* (2013.01); *G02B 26/008* (2013.01); *G03B 21/204* (2013.01); *H04N 9/3114* (2013.01)

(58) Field of Classification Search
CPC . G03B 21/14; G03B 21/16; F21S 2/00; F21V 29/502; F21V 9/16; G02B 26/00; G02B 7/00; H04N 9/31
See application file for complete search history.

(56) References Cited

U.S. PATENT DOCUMENTS

| | | | |
|---|---|---|---|
| 9,010,971 B2 | 4/2015 | Wang et al. | |
| 2003/0095349 A1 | 5/2003 | Inamoto | |
| 2007/0211180 A1 | 9/2007 | Hur et al. | |
| (Continued) | | | |

FOREIGN PATENT DOCUMENTS

JP    2013-069547    4/2013

OTHER PUBLICATIONS

International Search Report and Written Opinion issued in Internatoinal Patent Application No. PCT/JP2016/003847, dated Nov. 8, 2016.

*Primary Examiner* — Sultan Chowdhury
*Assistant Examiner* — Danell L Owens
(74) *Attorney, Agent, or Firm* — McDermott Will & Emery LLP

(57) ABSTRACT

A phosphor wheel includes: a substrate having a first main surface, a second main surface opposite to the first main surface, and an open portion; a phosphor layer provided on the first main surface; and a fin provided on the second main surface. The fin is nearer a center of the substrate than the phosphor layer is, and the open portion is located between the phosphor layer and the fin.

9 Claims, 5 Drawing Sheets

(56) References Cited

U.S. PATENT DOCUMENTS

2013/0169938 A1* 7/2013 Huang ................ G03B 21/16
                                                                                       353/31

2013/0301237 A1   11/2013  Finsterbusch et al.

\* cited by examiner

PHOSPHOR WHEEL AND PROJECTION-TYPE IMAGE DISPLAY DEVICE

CROSS REFERENCE TO RELATED APPLICATIONS

This application is a U.S. continuation application of PCT International Patent Application Number PCT/JP2016/003847 filed on Aug. 24, 2016, claiming the benefit of priority of Japanese Patent Application Number 2016-045034 filed on Mar. 8, 2016, the entire contents of which are hereby incorporated by reference.

BACKGROUND

1. Technical Field

The present disclosure relates to a phosphor wheel used as a light source of a projection-type image display device or the like.

2. Description of the Related Art

A projection-type image display device including a phosphor wheel that emits light when laser light (excitation light) is applied from a laser light source is known. The phosphor wheel is rotated about its rotation axis while laser light is being applied to a phosphor layer. This prevents phosphor particles from degrading due to heat generated by the application of laser light.

As a technique of enhancing the heat dissipation property of the phosphor wheel, Japanese Unexamined Patent Application Publication No. 2013-69547 discloses a technique of providing an uneven structure of a width on the order of nanometers to sub-micrometers on the back surface of a substrate that has the phosphor layer on its front surface.

SUMMARY

The present disclosure provides a phosphor wheel that can effectively cool a phosphor layer.

A phosphor wheel according to one aspect of the present disclosure includes: a substrate having a first main surface, a second main surface opposite to the first main surface, and an open portion; a phosphor layer provided on the first main surface; and a fin provided on the second main surface, wherein the fin is nearer a center of the substrate than the phosphor layer is, and the open portion is located between the phosphor layer and the fin.

The phosphor wheel according to one aspect of the present disclosure can effectively cool the phosphor layer.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

The following describes embodiments in detail, with reference to drawings as appropriate. In the following, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

Embodiment 1

[Structure]

Figure 1:
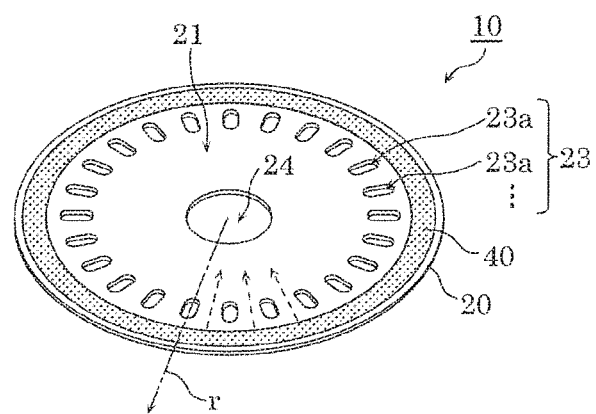
FIG. 1 is a perspective view of a phosphor wheel according to Embodiment 1 as seen from the first main surface side.
Figure 2:
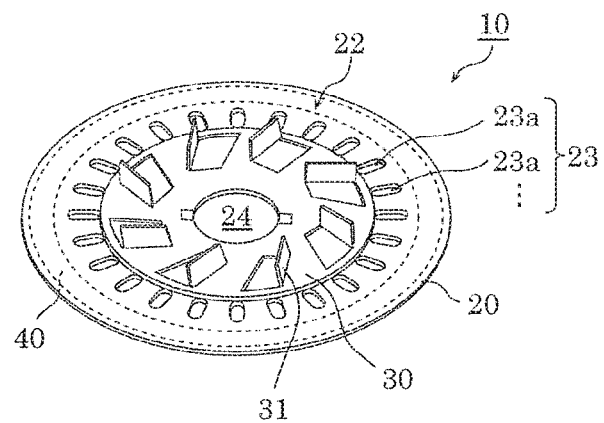
FIG. 2 is a perspective view of the phosphor wheel according to Embodiment 1 as seen from the second main surface side.
Figure 3:
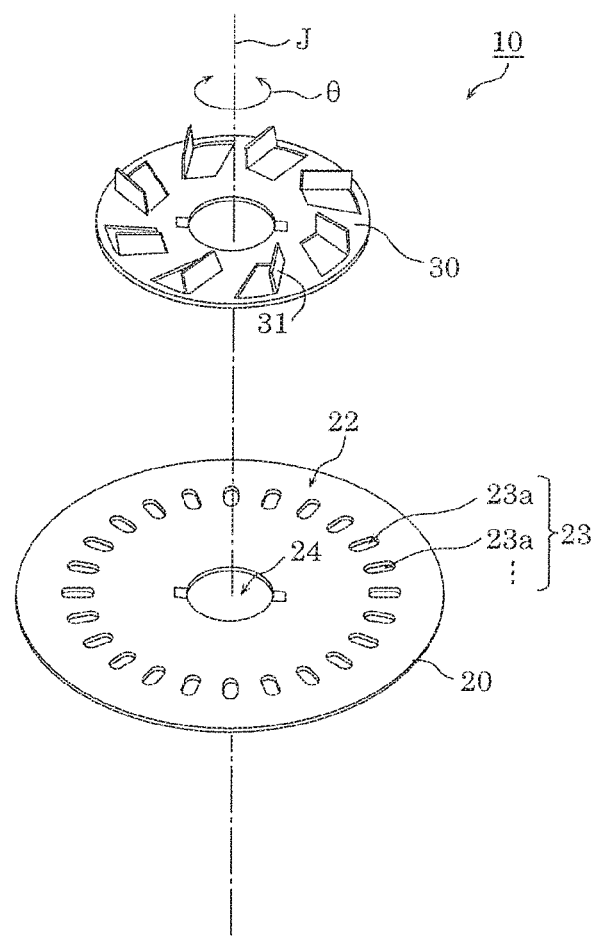
FIG. 3 is an exploded perspective view of the phosphor wheel according to Embodiment 1.

The structure of a phosphor wheel according to Embodiment 1 is described first. FIG. 1 is a perspective view of the phosphor wheel according to Embodiment 1 as seen from the first main surface side. FIG. 2 is a perspective view of the phosphor wheel according to Embodiment 1 as seen from the second main surface side. FIG. 3 is an exploded perspective view of the phosphor wheel according to Embodiment 1. In the following embodiment, the radial direction of a circle about imaginary rotation axis J (illustrated in FIG. 3) is referred to as "radial direction r" (illustrated in FIG. 1), and the circumferential direction of the circle about rotation axis J as "circumferential direction θ" (illustrated in FIG. 3).

Phosphor wheel 10 includes substrate 20 and fan member 30, as illustrated in FIGS. 1 to 3.

Phosphor wheel 10 is an optical member used for a light source of a projection-type image display device or the like. Phosphor layer 40 included in phosphor wheel 10 emits light when laser light is applied. To avoid the concentration of laser light at one point of phosphor layer 40, phosphor wheel 10 is rotated about rotation axis J by a motor while laser light is being applied to phosphor layer 40. This prevents phosphor particles included in phosphor layer 40 from degrading due to heat generated by the application of laser light.

Substrate 20 is a disk-shaped substrate centering at rotation axis J. In other words, substrate 20 is circular in shape in planar view. Here, a shape in planar view is a shape as seen in the direction perpendicular to substrate 20. The diameter of substrate 20 is about 8 cm as an example, although not particularly limited to such. Substrate 20 has first main surface 21, second main surface 22 opposite to first main surface 21, and open portion 23.

Main opening 24 is provided at the center of substrate 20, and a rotor included in the motor (not illustrated in FIGS. 1 to 3) is connected to main opening 24. Rotation axis J passes the center (center position) of substrate 20. Substrate 20 is rotated about rotation axis J by the motor. Substrate 20 is, for example, made of metal having good heat conductivity such as aluminum or stainless steel. Substrate 20 may be a sapphire substrate or the like.

Phosphor layer 40 is provided on first main surface 21 of substrate 20. Phosphor layer 40 is made of a resin material including a large number of yellow phosphor particles. The yellow phosphor particles are, for example, YAG-based yellow phosphor particles. The base material of the resin material is, for example, silicone resin having translucency and thermosetting property. Phosphor layer 40 is formed by screen printing such a resin material on first main surface 21 of substrate 20 and then thermally curing it in a heating furnace. A reflection film may be provided between first main surface 21 of substrate 20 and phosphor layer 40, although not illustrated in FIGS. 1 to 3.

Phosphor layer 40 is annular along circumferential direction θ of disk-shaped substrate 20, in planar view. Phosphor layer 40 may be situated on the periphery of first main surface 21. In Embodiment 1, the width of phosphor layer 40 in radial direction r is constant. Even in the case where substrate 20 is not a disk-shaped substrate, phosphor layer 40 is annular.

Fan member 30 is attached to the center of second main surface 22 of substrate 20. Fan member 30 has a plurality of fins 31. Fan member 30 is a disk-shaped substrate, and each cut and raised part of this substrate is fin 31. Thus, the plurality of fins 31 stand on second main surface 22 of substrate 20. The shape of the plurality of fins 31 is approximately rectangular (approximately trapezoidal) as an example, although not particularly limited to such.

The plurality of fins 31 are nearer the center of substrate 20 than phosphor layer 40 is. In other words, the plurality of fins 31 are surrounded by phosphor layer 40. The plurality of fins 31 are annularly arranged along circumferential direction θ to surround the center (rotation axis J) of substrate 20.

Fan member 30 is fixed to second main surface 22 by a fixing member such as a screw or an adhesive. Fan member 30 is rotated integrally with substrate 20 by the motor, and each of the plurality of fins 31 sends air to the outside of fin 31 (centrifugal direction) with the rotation of substrate 20. In other words, each of the plurality of fins 31 sends air toward open portion 23. Fan member 30 thus functions as a centrifugal fan. Air (airflow) generated by the plurality of fins 31 is used to cool phosphor layer 40.

For example, fan member 30 is formed by cutting and raising a plate material of metal such as stainless steel. The angle of each fin 31 with respect to radial direction r and the angle of each fin 31 with respect to second main surface 22 may be empirically or experimentally determined so that air can be effectively sent outward, and are not particularly limited.

Open portion 23 is an annular portion (region) where a plurality of openings 23a are provided in substrate 20. Open portion 23 thus includes the plurality of openings 23a. Each of the plurality of openings 23a is a through hole formed through substrate 20, and is an air vent through which air from any of the plurality of fins 31 passes. The plurality of openings 23a are annularly arranged along circumferential direction θ to surround the plurality of fins 31 (fan member 30). If the plurality of openings 23a are randomly arranged, the rotation of phosphor wheel 10 is unstable, causing abnormal noise, etc. The plurality of openings 23a are therefore arranged at regular intervals.

Advantageous Effects, Etc

Figure 4:
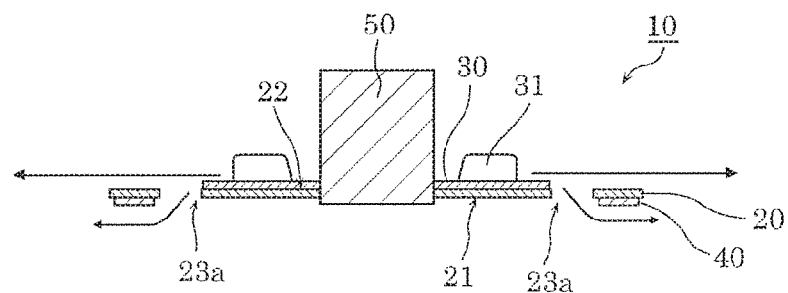
FIG. 4 is a schematic sectional view of the phosphor wheel according to Embodiment 1.

Open portion 23 is located between phosphor layer 40 and fins 31. The advantageous effects of this arrangement are described below. FIG. 4 is a schematic sectional view of phosphor wheel 10. FIG. 4 also schematically illustrates motor 50.

Phosphor layer 40 is provided on first main surface 21 of substrate 20 whereas each of the plurality of fins 31 is provided on second main surface 22 of substrate 20, as mentioned above. Accordingly, in the case where there is no open portion 23, the plurality of fins 31 can send air to second main surface 22 but cannot send air to first main surface 21. Thus, in the case where there is no open portion 23, the plurality of fins 31 cannot directly cool phosphor layer 40 on first main surface 21 by sending air.

In phosphor wheel 10, however, open portion 23 is located between phosphor layer 40 and fins 31. Hence, outward air generated by the plurality of fins 31 can be directed toward phosphor layer 40 through the plurality of openings 23a, as illustrated in FIG. 4. The plurality of fins 31 can directly air-cool phosphor layer 40 in this way.

To reduce the size of the projection-type image display device including phosphor wheel 10, as few members as possible may be provided on first main surface 21 of phosphor wheel 10. In phosphor wheel 10, fins 31 are provided on second main surface 22. This achieves both a reduction in size of the projection-type image display device including phosphor wheel 10 and cooling of phosphor layer 40.

The provision of open portion 23 also makes phosphor wheel 10 more lightweight. This has the advantageous effect of reducing the load on motor 50.

The heat dissipation property of phosphor layer 40 can decrease depending on the shape and arrangement of the plurality of openings 23a. For example, if the total opening area of the plurality of openings 23a is excessively large, the heat dissipation path from phosphor layer 40 toward the center of substrate 20 is narrow, which can cause a decrease in heat dissipation property.

In phosphor wheel 10, however, each of the plurality of openings 23a is longer in radial direction r of substrate 20. In detail, each of the plurality of openings 23a is shaped like a race track longer in radial direction r. Each of the plurality of openings 23a may be shaped like an ellipse or oval longer in radial direction r, or a rectangle longer in radial direction r. A shape longer in radial direction r is equivalent to a shape shorter in circumferential direction θ.

Thus, when each of the plurality of openings 23a is longer in radial direction r of substrate 20, the heat dissipation path from phosphor layer 40 to the center of substrate 20 is ensured easily, as indicated by the dashed arrows in FIG. 1 described above. A decrease in heat dissipation from phosphor layer 40 to substrate 20 can therefore be prevented.

Variation 1

Figure 5:
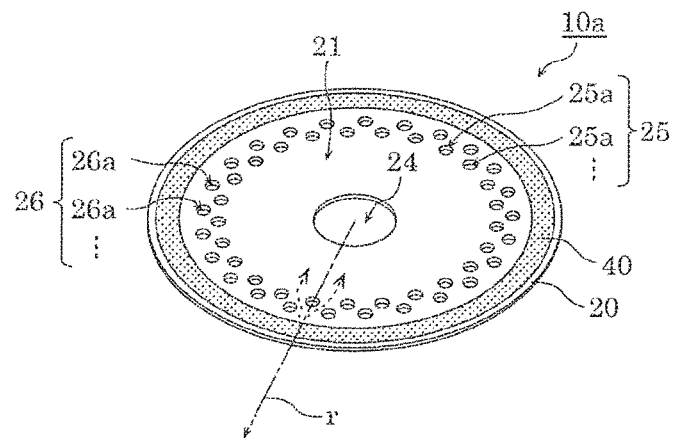
FIG. 5 is a perspective view of a phosphor wheel according to Variation 1 as seen from the first main surface side.
Figure 6:
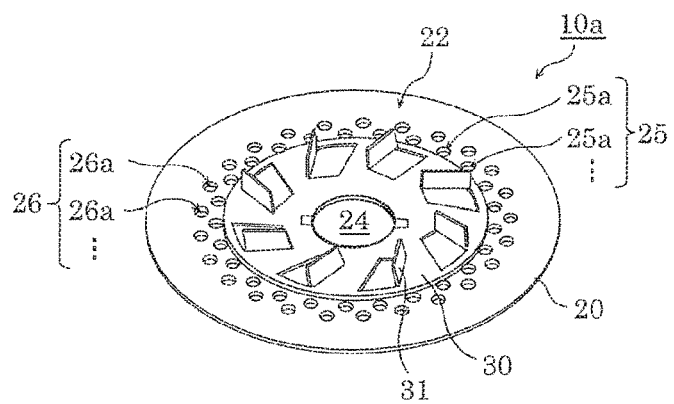
FIG. 6 is a perspective view of the phosphor wheel according to Variation 1 as seen from the second main surface side.

The arrangement and shape of openings 23a in open portion 23 described in Embodiment 1 are an example, and the present disclosure is not particularly limited to such. A phosphor wheel according to Variation 1 that differs in the arrangement and shape of the openings in the open portion from phosphor wheel 10 is described below. FIG. 5 is a perspective view of the phosphor wheel according to Variation 1 as seen from the first main surface 21 side. FIG. 6 is a perspective view of the phosphor wheel according to Variation 1 as seen from the second main surface 22 side. The following description of Variation 1 mainly focuses on the differences from phosphor wheel 10, and the same description as that of phosphor wheel 10 is omitted.

An open portion in phosphor wheel 10a according to Variation 1 has first open portion 25 and second open portion 26 surrounding first open portion 25, as illustrated in FIGS. 5 and 6.

First open portion 25 is a region where a plurality of openings 25a are provided in substrate 20. First open portion 25 thus includes the plurality of openings 25a. The plurality of openings 25a are annularly arranged along circumferential direction θ to surround the plurality of fins 31. First open portion 25 is situated inside (on the inner peripheral side of) second open portion 26. Each opening 25a has a circular shape.

Second open portion 26 is a region where a plurality of openings 26a are provided in substrate 20. Second open portion 26 thus includes the plurality of openings 26a. The plurality of openings 26a are annularly arranged along circumferential direction θ to surround the plurality of openings 25a. Second open portion 26 is thus situated outside (on the outer peripheral side of) first open portion 25. Each opening 26a has a circular shape with the same size as opening 25a. Opening 25a and opening 26a may differ in shape and size from each other. Opening 25a and opening 26a may each have a shape longer in radial direction r.

In such phosphor wheel 10a, too, the open portion (first open portion 25 and second open portion 26) is located between phosphor layer 40 and fins 31. Hence, outward air generated by the plurality of fins 31 can be directed toward phosphor layer 40 through the plurality of openings 25a and the plurality of openings 26a. The plurality of fins 31 can directly air-cool phosphor layer 40 in this way.

The heat dissipation property of phosphor layer 40 can decrease depending on the shape and arrangement of the plurality of openings 25a and the plurality of openings 26a, as mentioned earlier. In phosphor wheel 10a, however, opening 25a included in first open portion 25 and opening 26a included in second open portion 26 are not aligned in radial direction r of substrate 20 (opening 26a is situated between openings 25a). Thus, the heat dissipation path from phosphor layer 40 to the center of substrate 20 is ensured easily, as indicated by the dashed arrows in FIG. 5. A decrease in heat dissipation from phosphor layer 40 to substrate 20 can therefore be prevented.

Variation 2

Figure 7:
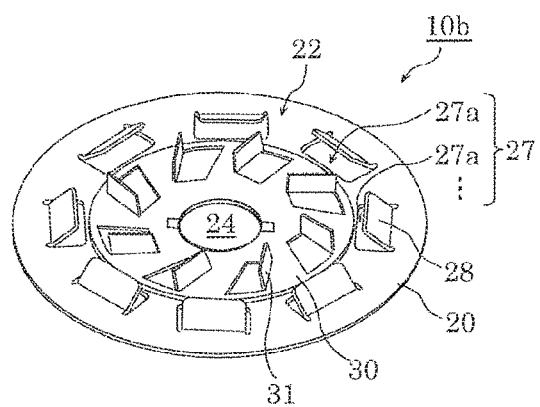
FIG. 7 is a perspective view of a phosphor wheel according to Variation 2 as seen from the second main surface side.

Each opening in the open portion may be formed by cutting and raising substrate 20. Such a phosphor wheel according to Variation 2 is described below. FIG. 7 is a perspective view of the phosphor wheel according to Variation 2 as seen from the second main surface 22 side. The following description of Variation 2 mainly focuses on the differences from phosphor wheel 10, and the same description as that of phosphor wheel 10 is omitted.

Open portion 27 included in phosphor wheel 10b according to Variation 2 is a region where a plurality of openings 27a are provided in substrate 20, as illustrated in FIG. 7. Open portion 27 thus includes the plurality of openings 27a. The plurality of openings 27a are annularly arranged along circumferential direction θ to surround the plurality of fins 31 (fan member 30).

Each of the plurality of openings 27a is formed by cutting and raising part of substrate 20. The shape of each opening 27a is approximately a rectangle (rectangle with rounded corners) whose shorter sides lie along radial direction r.

Figure 8:
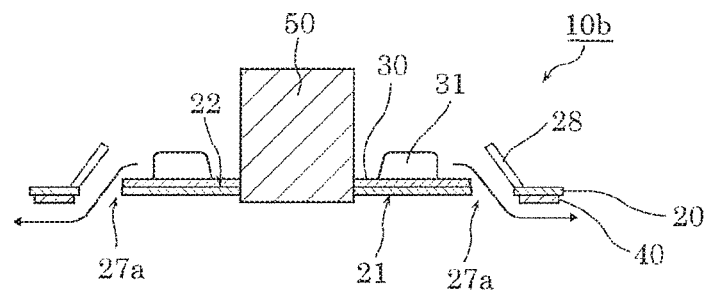
FIG. 8 is a schematic sectional view of the phosphor wheel according to Variation 2.

Although opening 27a may be formed by cutting and raising part of substrate 20 in any direction, part of substrate 20 is cut and raised to the outer peripheral side in phosphor wheel 10b. Hence, cut and raised portion 28 which is the cut and raised part of substrate 20 stands on second main surface 22, and is located between open portion 27 (opening 27a) and phosphor layer 40. The main surface of cut and raised portion 28 intersects with radial direction r. The advantageous effects of such cut and raised portion 28 are described below, with reference to FIG. 8. FIG. 8 is a schematic sectional view of phosphor wheel 10b.

As illustrated in FIG. 8, air sent outward by the plurality of fins 31 strikes cut and raised portion 28 and is guided to opening 27a. This increases the amount of air directed toward first main surface 21 through the plurality of openings 27a, from among the outward air generated by the plurality of fins 31. The amount of air directed toward phosphor layer 40 can thus be increased to enhance the effect of cooling phosphor layer 40.

Such an advantageous effect is achieved when phosphor wheel 10b includes a plate material that stands on second main surface 22 and is located between open portion 27 and phosphor layer 40. The aforementioned cut and raised portion 28 is an example of such a plate material, and the plate material need not be formed by cutting and raising substrate 20. For example, a plate material separate from substrate 20 may be attached to substrate 20.

Variation 3

Figure 9:
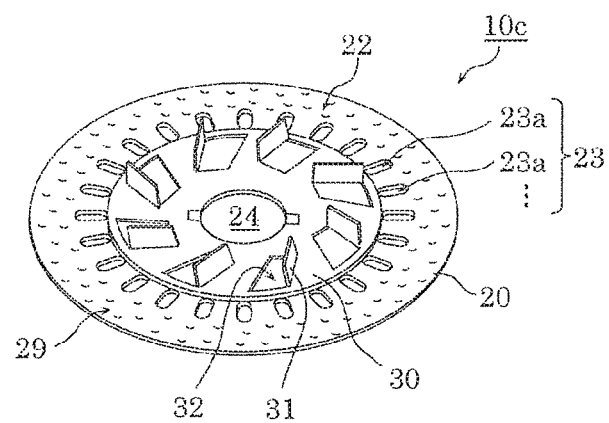
FIG. 9 is a perspective view of a phosphor wheel according to Variation 3 as seen from the second main surface side.

The part of second main surface 22 overlapping phosphor layer 40 may have an uneven structure. Such a phosphor wheel according to Variation 3 is described below. FIG. 9 is a perspective view of the phosphor wheel according to Variation 3 as seen from the second main surface 22 side. The following description of Variation 3 mainly focuses on the differences from phosphor wheel 10, and the same description as that of phosphor wheel 10 is omitted.

The part of second main surface 22 of substrate 20 in phosphor wheel 10c according to Variation 3 overlapping phosphor layer 40 has uneven structure 29, as illustrated in FIG. 9. This increases the surface area of the part of second main surface 22 overlapping phosphor layer 40, and so facilitates the cooling of phosphor layer 40 when part of the outward air from fins 31 strikes this part. The specific mode (shape, depth, etc.) of uneven structure 29 is not particularly limited.

Variation 4

Figure 10:
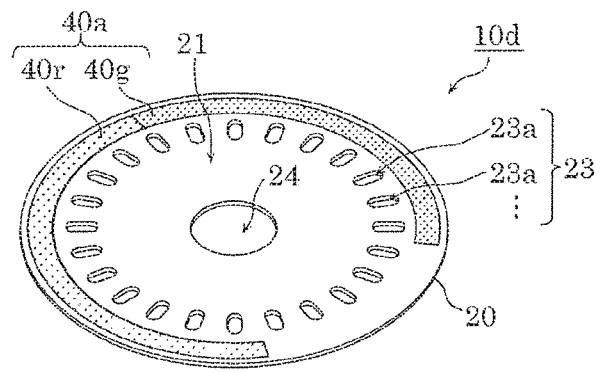
FIG. 10 is a perspective view of a phosphor wheel according to Variation 4 as seen from the first main surface side.

The phosphor layer need not be annular, and may be partly discontinuous. The phosphor layer may have any shape extending in circumferential direction θ of substrate 20, that is, arc-shaped. Moreover, the phosphor particles included in the phosphor layer are not limited to yellow phosphor particles, and may be other phosphor particles that emit light of a different color such as red phosphor particles or green phosphor particles. Such a phosphor wheel according to Variation 4 is described below. FIG. 10 is a perspective view of the phosphor wheel according to Variation 4 as seen from the first main surface 21 side.

Phosphor layer 40a is provided on first main surface 21 of substrate 20 included in phosphor wheel 10d, as illustrated in FIG. 10. Phosphor layer 40a is not annular, but has a long shape along circumferential direction θ of substrate 20, that is, arc-shaped.

In detail, phosphor layer 40a is composed of red phosphor layer 40r and green phosphor layer 40g. Red phosphor layer 40r and green phosphor layer 40g are both arc-shaped, and are connected at their respective ends in circumferential direction θ.

Red phosphor layer 40r includes red phosphor particles. The red phosphor particles are, for example, $CaAlSiN_3:Eu^{2+}$ or $(Sr,Ca)AlSiN_3:Eu^{2+}$. Green phosphor layer 40g includes green phosphor particles. The green phosphor particles are, for example, $Y_3(Al,Ga)_5O_{12}:Ce^{3+}$ or $Lu_3Al_5O_{12}:Ce^{3+}$.

The use of such phosphor wheel 10d in a projection-type image display device enables red, green, and blue light to enter an optical modulator (imaging element) included in the projection-type image display device in a time-sharing manner.

Phosphor layer 40a is partly discontinuous in phosphor wheel 10d. In this case, too, open portion 23 is formed in the same way as in the case where phosphor layer 40a is not partly discontinuous.

Conclusion of Embodiment 1

As described above, phosphor wheel 10 includes: substrate 20 having first main surface 21, second main surface 22 opposite to first main surface 21, and open portion 23; phosphor layer 40 provided on first main surface 21; and fin 31 provided on second main surface 22. Fin 31 is nearer a center of substrate 20 than phosphor layer 40 is, and open portion 23 is located between phosphor layer 40 and fin 31. Fin 31 sends air toward phosphor layer 40 with the rotation of substrate 20.

With this, outward air generated by fin 31 can be directed toward phosphor layer 40 on first main surface 21 through opening 23a. Fin 31 can directly air-cool phosphor layer 40 in this way. In other words, phosphor wheel 10 can effectively cool phosphor layer 40.

Substrate 20 may be disk-shaped. Phosphor layer 40 may extend in circumferential direction θ of substrate 20. Fin 31 may include a plurality of fins 31 annularly arranged to surround the center of substrate 20. Open portion 23 may include a plurality of openings 23a annularly arranged to surround the plurality of fins 31.

With this, outward air generated by the plurality of fins 31 can be directed toward phosphor layer 40 through the plurality of openings 23a. The plurality of fins 31 can directly air-cool phosphor layer 40 in this way. In other words, phosphor wheel 10 can effectively cool phosphor layer 40.

Each of the plurality of openings 23a may be elongated in a radial direction of substrate 20.

With this, the heat dissipation path from phosphor layer 40 to the center of substrate 20 is ensured easily. A decrease in heat dissipation from phosphor layer 40 to substrate 20 can therefore be prevented.

The open portion may include first open portion 25 and second open portion 26 surrounding first open portion 25, and opening 25a included in first open portion 25 and opening 26a included in second open portion 26 may be not aligned in radial direction r of substrate 20, as in phosphor wheel 10a.

With this, the heat dissipation path from phosphor layer 40 to the center of substrate 20 is ensured easily. A decrease in heat dissipation from phosphor layer 40 to substrate 20 can therefore be prevented.

Phosphor wheel 10b may include cut and raised portion 28 standing on second main surface 22 and located between open portion 27 and phosphor layer 40. Cut and raised portion 28 is an example of a plate material.

With this, air sent outward by the plurality of fins 31 strikes cut and raised portion 28 and is guided to opening 27a. This increases the amount of air directed toward first main surface 21 through the plurality of openings 27a, from among the outward air generated by the plurality of fins 31. The amount of air directed toward phosphor layer 40 can thus be increased to enhance the effect of cooling phosphor layer 40.

A part of second main surface 22 overlapping phosphor layer 40 may have uneven structure 29, as in phosphor wheel 10c.

With this, the surface area of the part of second main surface 22 overlapping phosphor layer 40 is increased, which facilitates the cooling of phosphor layer 40 when part of the outward air from fin 31 strikes this part.

Embodiment 2

[Structure]

Figure 11:
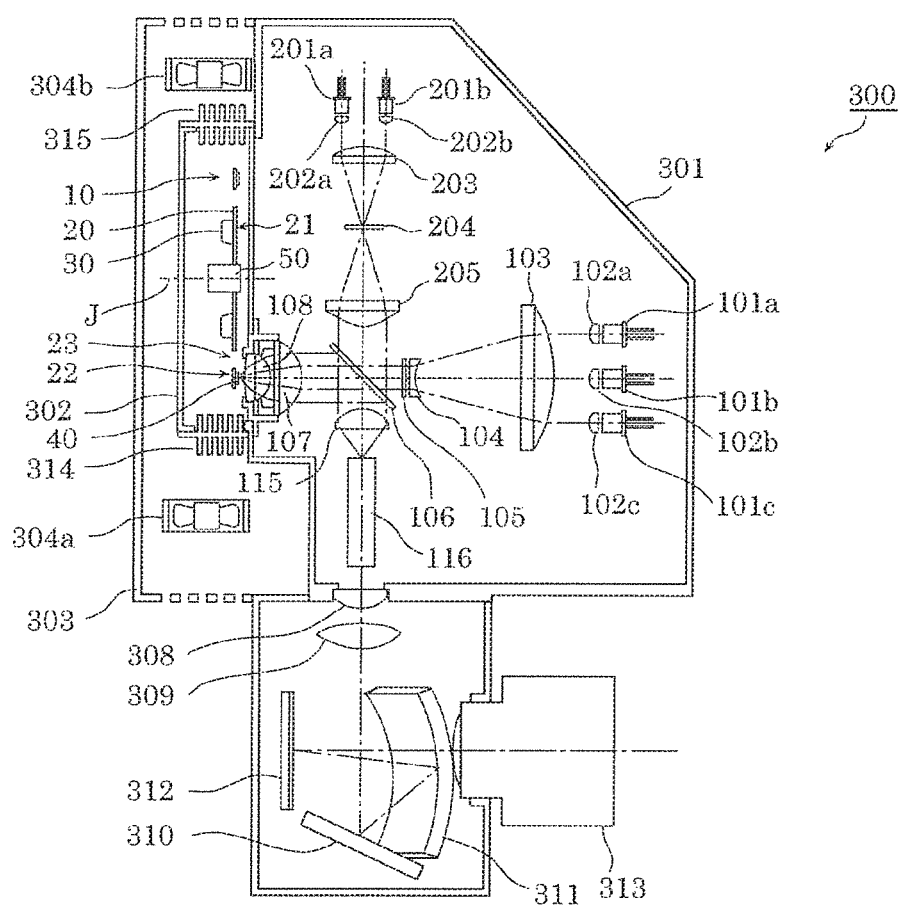
FIG. 11 is a diagram illustrating an optical system of a projection-type image display device according to Embodiment 2.

Embodiment 2 describes a projection-type image display device including phosphor wheel 10 according to Embodiment 1. FIG. 11 is a diagram illustrating an optical system of the projection-type image display device according to Embodiment 2.

Projection-type image display device 300 according to Embodiment 2 is, for example, a high-luminance projector capable of applying light of about 20000 lumens. For example, projection-type image display device 300 is used for projection mapping. Projection-type image display device 300 may be a low-luminance projector for home use.

As illustrated in FIG. 11, projection-type image display device 300 includes blue laser diodes 101a, 101b, and 101c, collimate lenses 102a, 102b, and 102c, lens 103, lens 104, and diffuser 105. Projection-type image display device 300 also includes dichroic mirror 106, lens 107, lens 108, and rod integrator 116. Projection-type image display device 300 also includes blue laser diodes 201a and 201b, collimate lenses 202a and 202b, lens 203, diffuser 204, and lens 205. Projection-type image display device 300 also includes lens 308, lens 309, mirror 310, mirror 311, optical modulator 312, and projection lens 313.

Projection-type image display device 300 also includes the aforementioned phosphor wheel 10 and motor 50 that rotates phosphor wheel 10. Motor 50 is an outer rotor motor as an example, although not particularly limited to such. Projection-type image display device 300 may include any of phosphor wheels 10a to 10d, instead of phosphor wheel 10.

Blue laser diodes 101a, 101b, and 101c are an example of a laser light source, and each emit blue light for exciting phosphor layer 40 included in phosphor wheel 10. In other words, blue laser diodes 101a, 101b, and 101c apply laser light to phosphor layer 40. The blue light emitted from blue laser diodes 101a, 101b, and 101c is collimated respectively by collimate lenses 102a, 102b, and 102c, and then converges through lens 103 and lens 104 that constitute an afocal system. The blue light that has converged through lens 103 and lens 104 is incident on diffuser 105 and as a result is diffused, and then is incident on dichroic mirror 106.

Dichroic mirror 106 has a property of allowing blue light to pass through and reflecting light of any emission color other than blue light. Accordingly, the blue light incident on dichroic mirror 106 from diffuser 105 passes through the dichroic mirror, further passes through lens 107 and lens 108, and then is incident on phosphor layer 40 in phosphor wheel 10.

Here, phosphor wheel 10 is rotated about rotation axis J by motor 50. This avoids the concentration of the blue light at one point of phosphor layer 40, and prevents the phosphor particles included in phosphor layer 40 from degrading due to heat generated by the application of the blue light.

The yellow phosphor particles in phosphor layer 40 emit yellow light when excited by the blue light. The yellow light is reflected by the reflection film provided between first main surface 21 of substrate 20 and phosphor layer 40, and is incident on dichroic mirror 106.

Dichroic mirror 106 reflects light of any emission color other than blue light, as mentioned above. Dichroic mirror 106 is also inclined at 45 degrees with respect to the optical axis of incident light. The yellow light incident on dichroic mirror 106 is accordingly reflected and bent at 90 degrees, and is incident on lens 115 and then rod integrator 116.

Meanwhile, blue laser diodes 201a and 201b each emit blue light. The blue light emitted from blue laser diodes 201a and 201b are collimated respectively by collimate lenses 202a and 202b. The collimated blue light converges through lens 203, and is then approximately parallelized by diffuser 204. The approximately parallelized blue light passes through lens 205, dichroic mirror 106, and lens 107 in this order, and then is incident on rod integrator 116.

Thus, white light obtained by mixing the yellow light and the blue light is incident on rod integrator 116. A lens array composed of rectangular lenses may be used instead of rod integrator 116.

Light emitted from rod integrator 116 passes through lens 308 and lens 309 that constitute a relay optical system, is reflected by mirror 310 and mirror 311, and then is incident on optical modulator 312.

Optical modulator 312 modulates the light emitted from phosphor layer 40 in response to the laser light applied by blue laser diodes 101a, 101b, and 101c, based on an image signal. The modulated light is incident on projection lens 313. Projection lens 313 projects the light modulated by optical modulator 312, onto a screen as an example. As a result, an image is displayed on the screen.

In the optical system illustrated in FIG. 11, a reflective imaging element such as a micromirror array or a reflective liquid crystal panel (LCOS: Liquid Crystal On Silicon) is used as optical modulator 312. Alternatively, a transmissive imaging element such as a transmissive liquid crystal panel may be used as optical modulator 312.

The heat dissipation structure of projection-type image display device 300 is described below. Projection-type image display device 300 includes first housing 301 mainly storing the optical system, second housing 302 storing phosphor wheel 10, and third housing 303. Third housing 303 includes second housing 302 and cooling fans 304a and 304b for cooling second housing 302.

Because of a large amount of heat generation around phosphor wheel 10, phosphor wheel 10 is stored in second housing 302 to be isolated from the other components. In this way, the difference between the temperature of external air as a coolant and the temperature inside second housing 302 is increased to improve heat exchange efficiency. Heatsinks 314 and 315 each having a plurality of heat dissipation fins are provided on the sides of second housing 302 (on the sides of phosphor wheel 10 in second housing 302).

When phosphor wheel 10 is rotated about rotation axis J by motor 50, the plurality of fins 31 in fan member 30 send air to the sides of phosphor wheel 10 (centrifugal direction). Heatsinks 314 and 315 may be provided on the sides of phosphor wheel 10, to cool the air and lower the temperature inside second housing 302.

Cooling fans 304a and 304b are located on the sides of second housing 302, and send air respectively to heatsinks 314 and 315. This improves the heat exchange efficiency of heatsinks 314 and 315.

To reduce the size of projection-type image display device 300, second housing 302 may be as small as possible. This may require phosphor layer 40 (first main surface 21) of phosphor wheel 10 and the inner surface of second housing 302 to be close to each other, as illustrated in FIG. 11. Accordingly, fan member 30 is placed on second main surface 22 of substrate 20 in phosphor wheel 10. To effectively cool phosphor layer 40 in such arrangement of fan member 30, open portion 23 is provided in substrate 20.

Conclusion of Embodiment 2

As described above, projection-type image display device 300 includes: phosphor wheel 10; motor 50 that rotates phosphor wheel 10; blue laser diodes 101a, 101b, and 101c that apply laser light to phosphor layer 40; optical modulator 312 that modulates light emitted from phosphor layer 40 in response to the laser light applied by blue laser diodes 101a, 101b, and 101c, based on an image signal; and projection lens 313 that projects the light modulated by optical modulator 312. Blue laser diodes 101a, 101b, and 101c are an example of a laser light source.

Such projection-type image display device 300 can effectively cool phosphor layer 40 included in phosphor wheel 10.

OVERALL CONCLUSION

Although Embodiments 1 and 2 have been described above to illustrate the disclosed technology, the disclosed technology is not limited to such. Changes, replacements, additions, omissions, etc. may be made to the embodiments as appropriate, and structural elements described in Embodiments 1 and 2 may be combined as a new embodiment.

The structural elements in the detailed description and the accompanying drawings may include not only the structural elements necessary for the solution but also the structural elements not necessary for the solution, to illustrate the disclosed technology. The inclusion of such optional structural elements in the detailed description and the accompanying drawings therefore does not mean that these optional structural elements are necessary structural elements.

The foregoing embodiments are intended to be illustrative of the disclosed technology, and so various changes, replacements, additions, omissions, etc. can be made within the scope of the claims and their equivalents.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a phosphor wheel and a projection-type image display device including a phosphor wheel.

What is claimed is:

1. A phosphor wheel comprising:
   a substrate having a first main surface, a second main surface opposite to the first main surface, and an open portion, the substrate being disk-shaped;
   a phosphor layer provided on the first main surface; and
   a fin provided on the second main surface,
   wherein the fin is nearer a center of the substrate than the phosphor layer is, and
   the open portion is located between the phosphor layer and the fin in a radial direction of the substrate.

2. The phosphor wheel according to claim 1,
   wherein
   the phosphor layer extends in a circumferential direction of the substrate,
   the fin includes a plurality of fins annularly arranged to surround the center of the substrate, and
   the open portion includes a plurality of openings annularly arranged to surround the plurality of fins.

3. The phosphor wheel according to claim 1, wherein each of the plurality of openings is elongated in the radial direction of the substrate.

4. The phosphor wheel according to claim 1,
   wherein the open portion includes a first open portion and a second open portion surrounding the first open portion, and
   an opening included in the first open portion and an opening included in the second open portion are not aligned in the radial direction of the substrate.

5. The phosphor wheel according to claim 1, further comprising a plate material standing on the second main surface and located between the open portion and the phosphor layer.

6. A phosphor wheel comprising:
   a substrate having a first main surface, a second main surface opposite to the first main surface, and an open portion;
   a phosphor layer provided on the first main surface; and
   a fin provided on the second main surface,
   wherein the fin is nearer a center of the substrate than the phosphor layer is,
   the open portion is located between the phosphor layer and the fin, and
   a part of the second main surface overlapping the phosphor layer has an uneven structure.

7. The phosphor wheel according to claim 1, wherein the fin sends air toward the phosphor layer with rotation of the substrate.

8. A projection-type image display device comprising:
   the phosphor wheel according to claim 1;
   a motor that rotates the phosphor wheel;
   a laser light source that applies laser light to the phosphor layer;
   an optical modulator that modulates light emitted from the phosphor layer in response to the laser light applied by the laser light source, based on an image signal; and
   a projection lens that projects the light modulated by the optical modulator.

9. A projection-type image display device comprising:
   the phosphor wheel according to claim 6;
   a motor that rotates the phosphor wheel;
   a laser light source that applies laser light to the phosphor layer;
   an optical modulator that modulates light emitted from the phosphor layer in response to the laser light applied by the laser light source, based on an image signal; and
   a projection lens that projects the light modulated by the optical modulator.

* * * * *

UNITED STATES PATENT AND TRADEMARK OFFICE
CERTIFICATE OF CORRECTION

PATENT NO. : 9,983,467 B2
APPLICATION NO. : 15/597990
DATED : May 29, 2018
INVENTOR(S) : Naoya Kitade et al.

Page 1 of 1

It is certified that error appears in the above-identified patent and that said Letters Patent is hereby corrected as shown below:

On the Title Page

Under item "(71) Applicant", please list the Applicant's name as follows:
(71) Applicant: PANASONIC INTELLECTUAL PROPERTY MANAGEMENT CO., LTD., Osaka, JP

Signed and Sealed this
Fourth Day of June, 2019

Andrei Iancu
*Director of the United States Patent and Trademark Office*